(12) United States Patent
Mircea

(10) Patent No.: US 11,119,244 B2
(45) Date of Patent: Sep. 14, 2021

(54) SYSTEM AND METHOD FOR NONINTRUSIVE COMPLETE AIRCRAFT INSPECTION

(71) Applicant: SC MB TELECOM LTD SRL, Ilfov County (RO)

(72) Inventor: Tudor Mircea, Ilfov County (RO)

(73) Assignee: SC MB TELECOM LTD SRL, Otopeni (RO)

( * ) Notice: Subject to any disclaimer, the term of this patent is extended or adjusted under 35 U.S.C. 154(b) by 695 days.

(21) Appl. No.: 15/113,559

(22) PCT Filed: Jan. 22, 2015

(86) PCT No.: PCT/RO2015/000002
§ 371 (c)(1),
(2) Date: Jul. 22, 2016

(87) PCT Pub. No.: WO2015/174875
PCT Pub. Date: Nov. 19, 2015

(65) Prior Publication Data
US 2017/0010383 A1    Jan. 12, 2017

(30) Foreign Application Priority Data
Jan. 23, 2014    (RO) .............................. a 2014 00068

(51) Int. Cl.
*G01N 23/04*    (2018.01)
*G01N 23/083*    (2018.01)
(Continued)

(52) U.S. Cl.
CPC ........... *G01V 5/0016* (2013.01); *G01N 23/04* (2013.01); *G01N 23/046* (2013.01); *G01N 23/18* (2013.01);
(Continued)

(58) Field of Classification Search
CPC .... G01V 5/0016; G01V 5/005; G01V 5/0058; G01V 5/0066; G01V 5/0025;
(Continued)

(56) References Cited

U.S. PATENT DOCUMENTS 6,255,654 B1 * 7/2001 Verbinski ............... G01N 23/02
250/358.1
6,507,025 B1 * 1/2003 Verbinski ............... G01N 23/02
250/358.1

(Continued)

*Primary Examiner* — Allen C. Ho
(74) *Attorney, Agent, or Firm* — Steven M. Shape; Dennemeyer & Associates, LLC

(57) ABSTRACT

The present invention consists of a method and a scanning system for nonintrusive inspection, through radiography of inspected aircrafts from at least two different perspectives. The complete scanning system for nonintrusive inspection of aircrafts according to the invention is a mobile nonintrusive scanning ensemble, installed on a vehicle chassis with a superstructure, on which a deformable parallelogram profile and a mechanical boom are mounted with a penetrating radiation source at one end. A detector line assembly is installed on the ground. A hinged boom is fitted with an array of detectors and positioned opposite a relocatable radiation source. The scanning system for nonintrusive inspection include a mobile tugging device to tow the inspected aircraft at constant speed through the scanning frames. A mobile control center is placed outside the exclusion area a.

5 Claims, 4 Drawing Sheets

Figure 1:
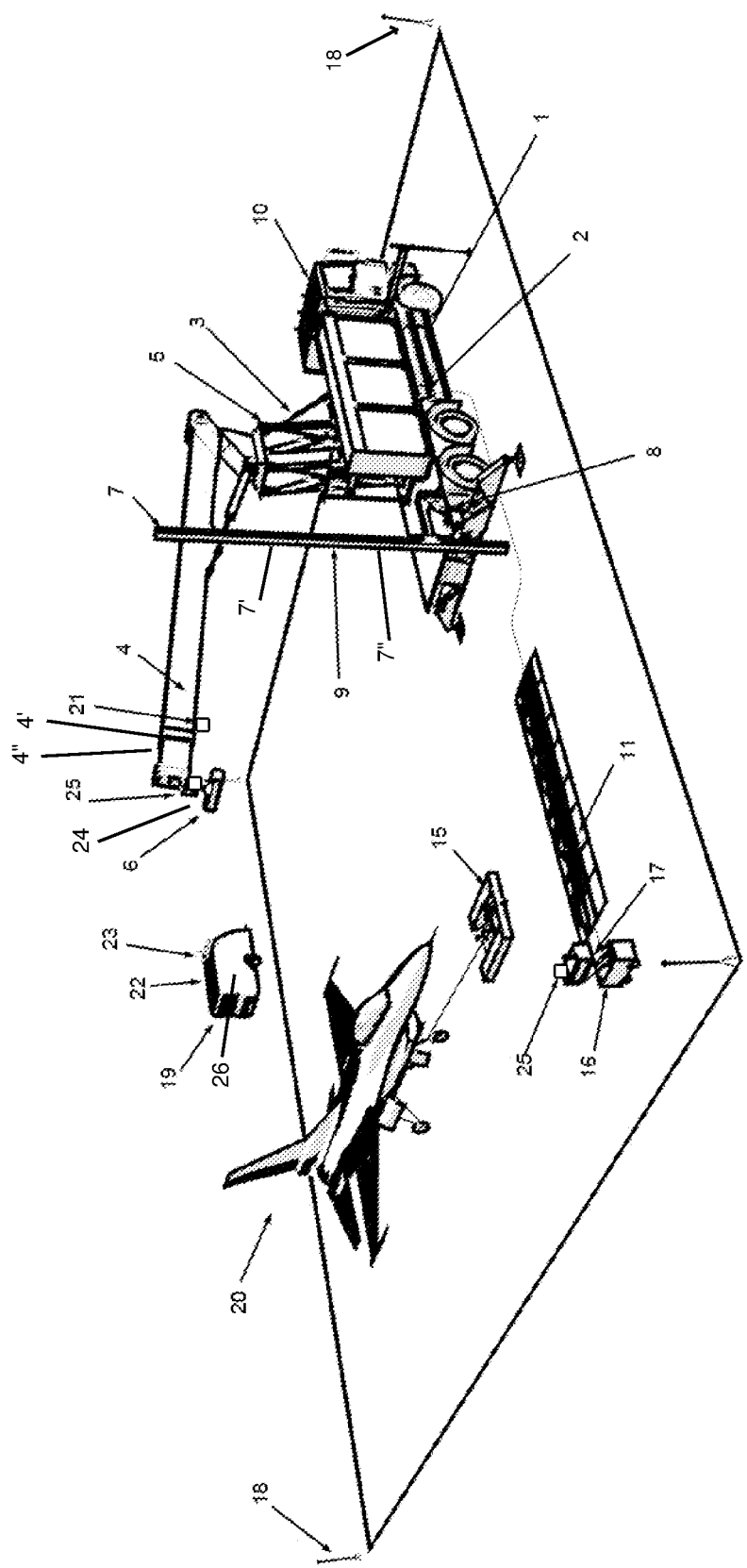

(51) Int. Cl.
*G01N 23/087* (2018.01)
*G01N 23/18* (2018.01)
*G01V 5/00* (2006.01)
*G01N 23/046* (2018.01)

(52) U.S. Cl.
CPC ............ *G01V 5/005* (2013.01); *G01V 5/0058* (2013.01); *G01V 5/0066* (2013.01); *G01N 2223/631* (2013.01); *G01N 2223/646* (2013.01)

(58) Field of Classification Search
CPC ...... G01N 23/04; G01N 23/046; G01N 23/18; G01N 23/083; G01N 23/087
USPC .................... 378/57, 58, 205, 206
See application file for complete search history.

(56) References Cited

U.S. PATENT DOCUMENTS

| | | | | |
|---|---|---|---|---|
| 6,542,580 B1* | 4/2003 | Carver | G01N 23/04 | 378/57 |
| 6,563,903 B2* | 5/2003 | Kang | G01N 23/04 | 378/55 |
| 6,614,872 B2* | 9/2003 | Bueno | G01N 23/04 | 378/58 |
| 6,763,635 B1* | 7/2004 | Lowman | B60P 1/5433 | 378/198 |
| 6,785,357 B2* | 8/2004 | Bernardi | G01N 23/04 | 378/193 |
| 6,843,599 B2* | 1/2005 | Le | G01V 5/0008 | 378/102 |
| 6,920,197 B2* | 7/2005 | Kang | G01N 23/04 | 378/198 |
| 6,922,461 B2* | 7/2005 | Kang | G01N 23/04 | 250/359.1 |
| 6,928,141 B2* | 8/2005 | Carver | G01N 23/04 | 378/197 |
| 6,937,692 B2* | 8/2005 | Johnson | G01N 23/04 | 378/55 |
| 6,972,693 B2* | 12/2005 | Brown | G01V 5/0008 | 250/358.1 |
| 7,039,159 B2* | 5/2006 | Muenchau | G01N 23/04 | 378/57 |
| 7,082,186 B2* | 7/2006 | Zhao | G01V 5/0016 | 378/145 |
| 7,103,137 B2* | 9/2006 | Seppi | G01T 1/2985 | 378/9 |
| 7,133,491 B2* | 11/2006 | Bernardi | G01V 5/0016 | 378/57 |
| 7,215,737 B2* | 5/2007 | Li | G01V 5/0016 | 378/57 |
| 7,239,245 B2* | 7/2007 | Kang | G01N 23/00 | 250/358.1 |
| 7,266,174 B2* | 9/2007 | Birdwell | G01N 23/04 | 378/58 |
| 7,274,767 B2* | 9/2007 | Clayton | G01N 23/04 | 378/57 |
| 7,302,035 B2* | 11/2007 | Hu | G01N 23/04 | 378/57 |
| 7,308,076 B2* | 12/2007 | Studer | G01V 5/0016 | 378/114 |
| 7,319,737 B2* | 1/2008 | Singh | G01N 23/10 | 378/57 |
| 7,322,745 B2* | 1/2008 | Agrawal | G01N 23/04 | 378/102 |
| 7,352,843 B2* | 4/2008 | Hu | G01N 23/04 | 378/198 |
| 7,356,116 B2* | 4/2008 | Anwar | G01V 5/0016 | 378/57 |
| 7,356,118 B2* | 4/2008 | Might | G01N 23/04 | 378/5 |
| 7,369,643 B2* | 5/2008 | Kotowski | G01N 23/04 | 378/197 |
| 7,379,530 B2* | 5/2008 | Hoff | G01V 5/0016 | 378/108 |
| 7,386,092 B2* | 6/2008 | Kang | G01V 5/0008 | 378/197 |
| 7,400,701 B1* | 7/2008 | Cason | G01V 5/0025 | 378/57 |
| 7,453,987 B1* | 11/2008 | Richardson | G01V 5/0041 | 378/57 |
| 7,460,639 B2* | 12/2008 | Tudor | G01V 5/0016 | 250/359.1 |
| 7,483,511 B2* | 1/2009 | Bendahan | G01N 23/04 | 378/57 |
| 7,486,768 B2* | 2/2009 | Allman | G01V 5/0008 | 378/147 |
| 7,497,618 B2* | 3/2009 | Chen | G01V 5/0016 | 378/198 |
| 7,505,556 B2* | 3/2009 | Chalmers | G01N 23/20 | 250/358.1 |
| 7,512,212 B2* | 3/2009 | Li | G01V 5/0016 | 250/370.09 |
| 7,526,064 B2* | 4/2009 | Akery | G01N 23/04 | 378/198 |
| 7,551,715 B2* | 6/2009 | Rothschild | G01V 5/0016 | 378/57 |
| 7,596,275 B1* | 9/2009 | Richardson | G01V 5/0016 | 250/358.1 |
| 7,660,386 B2* | 2/2010 | Meng | G01V 5/0008 | 378/189 |
| 7,663,109 B2* | 2/2010 | Kang | G01V 5/0008 | 250/359.1 |
| 7,702,070 B2* | 4/2010 | Kang | G01V 5/005 | 378/57 |
| 7,706,502 B2* | 4/2010 | Bueno | G01V 5/0016 | 378/19 |
| 7,734,008 B1* | 6/2010 | Sanders | G01V 5/0016 | 378/198 |
| 7,742,568 B2* | 6/2010 | Smith | G01N 23/087 | 378/57 |
| 7,780,390 B2* | 8/2010 | Fujiwara | G01V 5/0008 | 378/198 |
| 7,783,004 B2* | 8/2010 | Kotowski | G01N 23/04 | 378/57 |
| 7,819,580 B2* | 10/2010 | Song | G01V 5/0058 | 378/147 |
| 7,929,664 B2* | 4/2011 | Goodenough | G01V 5/005 | 378/57 |
| 7,963,695 B2* | 6/2011 | Kotowski | G01N 23/04 | 378/198 |
| 7,991,117 B2* | 8/2011 | Chen | G01V 5/0016 | 378/95 |
| 8,023,619 B2* | 9/2011 | McNabb, Jr. | G01V 5/0016 | 378/106 |
| 8,150,105 B2* | 4/2012 | Mian | G06T 7/001 | 382/104 |
| 8,194,822 B2* | 6/2012 | Rothschild | G01N 23/20 | 378/86 |
| 8,223,922 B2* | 7/2012 | Suyama | G01N 23/04 | 378/98.9 |
| 8,275,091 B2* | 9/2012 | Morton | G01V 5/0016 | 378/57 |
| 8,280,005 B2* | 10/2012 | Suyama | G01T 1/00 | 250/370.09 |
| 8,295,433 B2* | 10/2012 | Linev | G01V 5/005 | 378/205 |
| 8,340,245 B2* | 12/2012 | Herranz | G01N 23/04 | 378/4 |
| 8,345,817 B2* | 1/2013 | Fuchs | G01N 23/046 | 378/10 |
| 8,345,819 B2* | 1/2013 | Mastronardi | G01V 5/0008 | 378/198 |
| 8,439,565 B2* | 5/2013 | Mastronardi | G01N 23/04 | 378/205 |
| 8,457,274 B2* | 6/2013 | Arodzero | G01V 5/0041 | 378/53 |
| 8,472,583 B2* | 6/2013 | Star-Lack | G01V 5/005 | 378/4 |

(56) References Cited

U.S. PATENT DOCUMENTS

| | | | |
|---|---|---|---|
| 8,483,356 B2* | 7/2013 | Bendahan | G01V 5/0008 378/197 |
| 8,503,605 B2* | 8/2013 | Morton | G01V 5/0016 378/57 |
| 8,582,720 B2* | 11/2013 | Morton | G01V 5/0008 378/87 |
| 8,615,067 B2* | 12/2013 | Hayes | G01V 5/0008 378/51 |
| 8,654,922 B2* | 2/2014 | Bendahan | G01V 3/104 378/63 |
| 8,731,137 B2* | 5/2014 | Arroyo, Jr. | G01V 5/0033 378/57 |
| 8,824,632 B2* | 9/2014 | Mastronardi | G01V 5/0058 378/57 |
| 8,873,713 B2* | 10/2014 | Suyama | G01V 5/005 250/370.09 |
| 8,903,046 B2* | 12/2014 | Morton | G01V 5/0033 378/88 |
| 8,971,485 B2* | 3/2015 | Morton | G01V 5/0066 378/57 |
| 8,971,487 B2* | 3/2015 | Mastronardi | G01V 5/0008 378/57 |
| 9,031,734 B2* | 5/2015 | Froom | G01M 5/0016 701/29.3 |
| 9,036,779 B2* | 5/2015 | Morton | G01V 5/0041 378/57 |
| 9,057,679 B2* | 6/2015 | Morton | G01V 5/0008 |
| 9,158,027 B2* | 10/2015 | Morton | G01V 5/0083 |
| 9,218,933 B2* | 12/2015 | Langeveld | H01J 37/1472 |
| 9,274,065 B2* | 3/2016 | Morton | G01V 5/0066 |
| 9,285,488 B2* | 3/2016 | Arodzero | G01T 1/2006 |
| 9,310,323 B2* | 4/2016 | Bendahan | G01N 9/24 |
| 9,329,301 B2* | 5/2016 | Suyama | G01V 5/0041 |
| 9,352,851 B2* | 5/2016 | Tudor | G01V 5/0008 |
| 9,448,188 B2* | 9/2016 | Li | G01N 23/10 |
| 9,541,510 B2* | 1/2017 | Arodzero | G01V 5/0016 |
| 9,625,607 B2* | 4/2017 | Tudor | G01V 5/0016 |
| 9,778,391 B2* | 10/2017 | Chen | G01V 5/0016 |
| 9,791,590 B2* | 10/2017 | Morton | G01V 5/0016 |
| 9,989,668 B2* | 6/2018 | Sun | G01V 5/0016 |
| 10,088,595 B2* | 10/2018 | Kang | G01N 23/04 |
| 10,129,971 B2* | 11/2018 | Sun | H05H 7/02 |
| 10,254,435 B2* | 4/2019 | Douarre | G01V 5/0016 |

\* cited by examiner

SYSTEM AND METHOD FOR NONINTRUSIVE COMPLETE AIRCRAFT INSPECTION

The present invention consists of a system and method for rapid, complete and nonintrusive inspection of aircrafts using penetrating radiation. The inspection is achieved without direct human intervention on the inspected aircraft, thus eliminating time consuming activities such as actual physical control performed by authorized personnel to detect smuggling or threatening items on board or anomalies in the structure of mechanisms of the aircraft.

By using the present invention radiographic images of the inspected aircraft are obtained, images upon which an operator can evaluate the shape, amount (quantity) and nature of the goods and objects present in the scanned aircraft and structural defects of the aircraft. The system generates radiographic images of the inspected aircraft from two different perspectives, one substantially vertical and one substantially horizontal, thus obtaining accurate information on the positioning in space of the objects or areas of interest.

In civil aviation applications, the radiographies obtained with the system that implements the current invention can be used in order to discover smuggling, illegal transports of prohibited, or undeclared goods (drugs, explosives, weapons, large amount of money in cash, even hidden persons, etc.) using aircrafts as means of transportation, especially in cases when the contraband is placed inside the empty technical cavities of the fuselage or wings.

The system according to the present invention is a mobile one, being easily relocated from one airport area to another, the time required for transport/assembly/disassembly being a matter of hours. Authorities using such a system can create the surprise element in security screening, relocating the entire system in areas where carriers of illegal air transport do not expect. The deterrence effect of such a mobile system is therefore significantly higher, compared to fix screening systems.

In military applications, the system provides information about the integrity of inspected military aircraft, necessary to detect any faults, bullets or projectiles penetrating the body of the aircraft, or structural damages after combat mission. Military aircrafts are inspected upon return from combat missions. A military aircraft even if it is hit and damaged during the flight by a war projectile or by the shrapnel's of a projectile explosion, can sometimes operate if the damages are not severe enough to affect vital components for a safe flight. In-this situation, in order to maintain combat capability and efficiency, it is necessary for the ground staff to identify correct, complete and rapid the damages suffered. According to the present invention, the inspection system provides information about the structure and vital components of the aircraft, therefore about any possible damages in just a few minutes, which significantly reduces the diagnosis time; in normal circumstances, this time being a matter of days, or weeks, depending on the complexity of the aircraft, when classical methods based on disassembling the damaged aircraft are used. It is well known the fact that, in military applications, shortening the time for most operations is critical.

Currently the global market offers several scanning systems and methods for scanning of aircrafts using penetrating radiation. Some of these are non-destructive control systems that only scan certain areas of interest, using radiation detectors and x-ray generators located conveniently on one side and the other of the inspected area.

Usage of such systems for full inspection of the aircraft is limited on one side by the difficult positioning of the systems in certain areas and on the other side by the very long time required for repositioning the scanning system components that can take long hours even for partial inspection.

Other known systems scan the aircrafts in their integrity for security purposes and applications, using a radiation generator placed on a boom or frame, above the aircraft and a mobile detector system placed at ground level obtaining a single image of the aircraft. These systems obtain a radiographic image from a substantially vertical perspective, analyzed objects in the image being difficult to locate in space and can't provide any radiography of the landing gear area.

Such example is the system described by the 5014293/07.05.1991 patent. This system consists of a "C" shaped boom frame which has on one side the detector area and on the opposite side the radiation source. The system is used for generating computer tomography of components of an aircraft in order to detect damages of critical elements. The major disadvantage of this system consists of the shape of the boom and its size thus leading to the incapacity of inspecting the entire aircraft, scanning only some parts in a sequential manner. For example, the system will inspect initially the cabin of an airplane, then the wings one at a time, and then the rest of the fuselage, each sequence is accompanied by mounting/dismantling times. Another disadvantage of the system is that the boom has an optimal shape and size for inspecting a reduced size aircraft, being totally unsuitable for larger aircrafts.

In addition, the time for positioning/repositioning the scanning system for the various components is very long, significantly limiting the state of operability. The system is fixed, generally mounted in hangars, and so it has the disadvantage of lack of mobility.

Another inspection system described by the 6466643/15.10.2002 patent proposes a solution in which the radiation source is placed inside the fuselage and the detectors are placed on the exterior of the fuselage then moved synchronously in order to achieve radiographic image. The system and method have the disadvantage of inspecting only the fuselage without the wings. Furthermore, the inspection is an intrusive one, requiring access in the aircraft.

The system proposed in U.S. Pat. No. 8,483,356 B2 consists in the use of a boom or a mobile framework that supports the radiation generator and a mobile detector placed at ground level, these being aligned and moving synchronously to scan an aircraft that has a fixed position. The main disadvantages of this solution consists in the fact that the scanning system needs to bypass some obstacles such as the wheels, these not being scanned, and also permanently maintain a perfect synchronization between the two mobile subsystems. Furthermore the movement of mobile detectors under the structure of the aircraft, bypassing the wheels leads to long scan times and difficulties in generating a unified radiographic image.

Another non-intrusive scanning system is described in the patent application A/2012/00443(PCT/RO2012/000030), system however this does not give a complete radiographed image from two perspectives, but only a single perspective on the scanned aircraft, insufficient to accurately discriminate objects that are prohibited or undeclared on board and especially insufficient to identify damages to the onboard system and the aircraft structure generated by projectiles of war.

The technical issue solved by the present invention is the non-intrusive and complete inspection of aircrafts using an inspection system, with high capacity, that generates at least two complete radiographic images of the aircraft from different perspectives, while it said aircraft is towed by a tugging device located on the runway, through two scanning frames. The present patent application also relates to a method for non-intrusive inspection of aircraft that uses this system. In order to clarify the presentation of the system and method according to the present invention, a number of terms are used:

The penetrating radiation source refers to a source of ionizing radiation that can be natural sources of radioactive material (such as Co60 or Se75), X-ray generators or linear accelerators (LINAC), or other sources of penetrating radiation in the solid medium. When using a natural source, the choice of radioactive material shall be made depending on the desired penetration depth and size of the exclusion area available in the site where the scanning takes place.

The scanning frame refers to the assembly consisting of a penetrating radiation source and an array of radiation detectors located at a predefined distance, through which the scanned object travel, in this case, an aircraft.

The array of detectors refers to a set of penetrating radiation detectors aligned in one or more rows.

The detection module assembly refers to an ensemble of multiple identical arrays of detectors aligned one after another.

The nonintrusive inspection system implies the irradiation of two or more arrays of detectors, typically one set located on aircraft runway and the second set on a substantial vertical support. Electrical signals generated by the detectors are processed analogue/digitally in order to generate a radiographic image, which will appear on the monitor of a workstation. The processing of information generated from a large number of detectors, usually a few thousand, implies complex electronic blocks and a network of wires with a large number of parallel connections between the boom and the subsystems that generate a radiographic image.

The complete and non-intrusive inspection system of the aircrafts according to the present invention comprises of a mobile scanner unit, which may be a truck chassis on which it is installed a metal superstructure, carrying the inspection system components, a mobile aircraft towing unit, a computer system for acquisition, processing and display of data provided by the array of radiation detectors and for scanning process control, a first scanning frame that is used to obtain a radiographic image of the aircraft inspected by a substantially vertical projection, a second scanning frame used to obtain a radiographic image of the aircraft inspected by a substantially horizontal projection, a mechanical boom consisting of one or more segments connected to the mobile scanning unit on which is mounted an array of radiation detectors, which during scanning is in the extended position along the frame of the mobile scanning unit to the side of the inspected aircraft as well as a relocated radiation source positioned on the side of the inspected aircraft, on the opposite side of the mechanical boom so that its beam of radiation is directed to the mechanical boom and exposing the radiation detector array.

The scanning frame that generates a substantially vertical projection (top view) consists of a mechanical boom made up of one or more segments, which is connected at one end to the mobile scanning unit, and having at the other end mounted a penetrating radiation source which in scanning mode is positioned above the inspected aircraft, thus the beam of radiation emitted by the radiation source is directed towards the ground, in a substantial vertical plane and from an array of detectors installed on the ground, positioned under the inspected aircraft, so that the detectors are exposed to a the radiation source beam over which the inspected aircraft is passing, towed by the mobile unit.

The scanning frame which produces a substantially horizontal projection (side view) consists of another hinge mechanical arm, consisting of one or more segments connected to the mobile scanning unit on which is mounted another array of radiation detectors and which in scanning process has a substantially vertical position, on the side of the inspected aircraft and a relocatable radiation source placed at the side of the inspected aircraft on the opposite side of the mechanical boom so that its beam of radiation is directed towards the mechanical boom and exposes the radiation detector array.

In operating the system, the tugging device is towing the inspected aircraft through the two scanning frames, the movement is synchronized with the start of penetrating radiation sources and data acquisition from radiation detectors in order to obtain at least two radiographic images of the aircraft from different perspectives.

In the transport mode of the system, the mechanical boom and the hinged boom are folded in order to ensure a minimum overall dimensions, allowing classification of the vehicle in legal dimensions for transport on public roads. In scanning mode, the mechanical boom extends forming variable angle with the chassis of the mobile scanning unit, in its extension, angle dependent on the size (height and wingspan) of the aircraft to be scanned, and hinged boom is brought in substantial vertical position, oriented towards the rear side of the chassis, by a rotation movement against an axle at least 90 degrees.

The movement of the mechanic boom and the hinged boom are executed automatically by the hydraulic cylinders, servomechanism or electromechanical actuators according to commands received from a PLC through hydraulic valves or command components.

The mobile scanning unit (MSU) is equipped with a position monitoring subsystem of scanned aircraft from the scanning frames, which contains at least one proximity sensor that detects the presence of the aircraft in the proximity of the first scanning frame, in the direction of movement of the aircraft, which is used to automatically start the emission of radiation at the beginning of the scan and stop the emission of radiation at the end of the scan.

The scanning system includes a mobile remote control center (MRCC), which is positioned outside the exclusion area and its purpose is to manage remotely wireless or by cable all the processes involved in the nonintrusive inspection through an IT system interconnected with a computer system. Inside the mobile remote control center there is an acquisition, processing, storage and display subsystem of the scanned image. The scanning system also includes a perimeter protection subsystem.

The mobile scanning unit, in this case a truck chassis, is equipped with an supplementary chassis, on which the boom that holds the first source of radiation is mounted, on an intermediate deformable parallelogram-shaped support system, or a rigid intermediate segment, which in transport mode is folded on the platform of the mobile unit, while in scanning mode is extended up towards vertical position, so the mechanical boom attached can be raised to a proper height for easy scanning of the aircraft, boom wherein another implementing variant can have a fixed construction, or in an alternative implementing variant can be made of telescopic sections, extendable in length, depending on the size of the scanned aircraft.

The detector line (Modular Detection Assembly) is located on the running surface of the aircraft and is mounted in a metal housing made from an alloy with low weight, easy to handle, the whole assembly can be easily handled by the operator of the mobile scanning unit.

Along the supplementary chassis the hinged boom is mounted in a rotary joint around an axis, boom that is equipped with at least two arrays of radiation detectors.
In transport mode, the mechanical boom and the hinged boom are folded along the chassis, and the modular detection assembly, the relocatable source, of penetrating radiation as well as the mobile tugging device-are loaded onto the chassis, more exactly on the superstructure, the entire system going through the following sequence for the conversion of from the transport mode into the scanning mode:

- The detector line (modular detection assembly) is unloaded from the chassis and is assembled on the runway by the operator along the longitudinal axis of the chassis so that the vertical line lowered from the penetrating radiation source placed on end of the mechanical boom to fall to the center of the detector line (modular detection assembly);
- The chassis is locked to the ground through the 4-point hydraulically actuated supports; outriggers.
- The mobile penetrating radiation source is unloaded from the chassis and placed at a corresponding distance from the mobile scanning unit, so that through it and the mobile source radiation can pass the aircraft to be scanned.
- The tugging device is unloaded from the chassis and placed by the exclusion area's entrance, before the detector line, in order to be attached to the scanned aircraft;
- The mechanical boom executes a movement of elevation from the laid down position along the chassis towards the upward position, forming a variable angle to the plane of the chassis, angle determined by the size of the aircraft to be scanned;
- In the implementing version with telescopic boom, the mechanical boom executes a movement to extend up to a predefined length, depending on aircraft wingspan, and the folding boom executes a rotation movement of at least 90 degrees, from the driver's cabin to the rear side of the chassis, finally to be placed at a convenient angle, according to the size and wingspan of the aircraft to be scanned;

The nonintrusive control method, according to the invention, eliminates the disadvantages of previous systems in that, the mobile tugging unit is coupled to an inspected aircraft which is brought into the scanning zone, in the proper position and is trailed through the two scanning frames synchronized with the start of the two radiation sources and synchronized with the transmission of the data from the detector arrays to the subsystem for acquisition, processing and display of data from the radiation detectors where are acquired, stored and processed in order to generate and display radiographic images.

The aircraft is towed through the two scanning frames with a recommended scanning speed, depending on the type of the aircraft and the cargo declared, the speed being measured by a speed measurement subsystem, located on the mobile tugging device. The position monitoring subsystem of the scanned aircraft contains at least one proximity sensor that detects the presence of the aircraft in the proximity of the first scanning frame in the traveling direction of the aircraft and determine the start of the radiation sources.

The scanning process automatically stops in the following cases: when the aircraft has passed entirely through the two scanning frames, when intruders breach the exclusion area; at triggering of a sensor, signaling that the aircraft has lost its predefined trajectory; or when the aircraft is dangerously close to any of the components of the scanning system, when the aircrafts' speed fluctuates dangerously outside the predefined limits, said limits which the system cannot manage. The emergency stop of the scanning process can be initiated manually by the operator at any time during the scanning process. During the scanning process, the radiographed images are displayed on the operator's screen simultaneously and synchronized with the movement of the aircraft.

The advantages of the invention:
- Large number of aircrafts inspected in a short period of time (up to 20 per hour);
- Complete Inspection of the aircraft, including the cockpit, the aircraft body and baggage hold, the wings and any objects attached to the aircraft;
- Achieving a complete image of the scanned aircraft by viewing a radiographic mage from 2 different perspectives, top view and side view, generated by the two sources of penetrating radiation located on top and on the side of the inspected aircraft;
- Avoiding unfavorable cases of obtaining inconclusive radiographic images generated by unfavorable positions of the elements sought to be discovered by generating simultaneous two views from different perspectives, of which only one may be inconclusive;
- Eliminating the risk of professional irradiation of operators and the risk of accidental irradiation of potential intruders into the exclusion area;
- Using operating personnel limited to one person per shift;
- Mobility, flexibility and maneuverability of the system;
- High degree of automation;
- Increased productivity, increased numbers of aircraft inspected per unit of time, by automating the processes and reducing dead times due to ICT management processes;

Further, an example of implementing the invention is presented in connection with the figures from 1 to 4 that describe:

FIG. 1: perspective view of nonintrusive inspection system in a scanning mode

Figure 2:
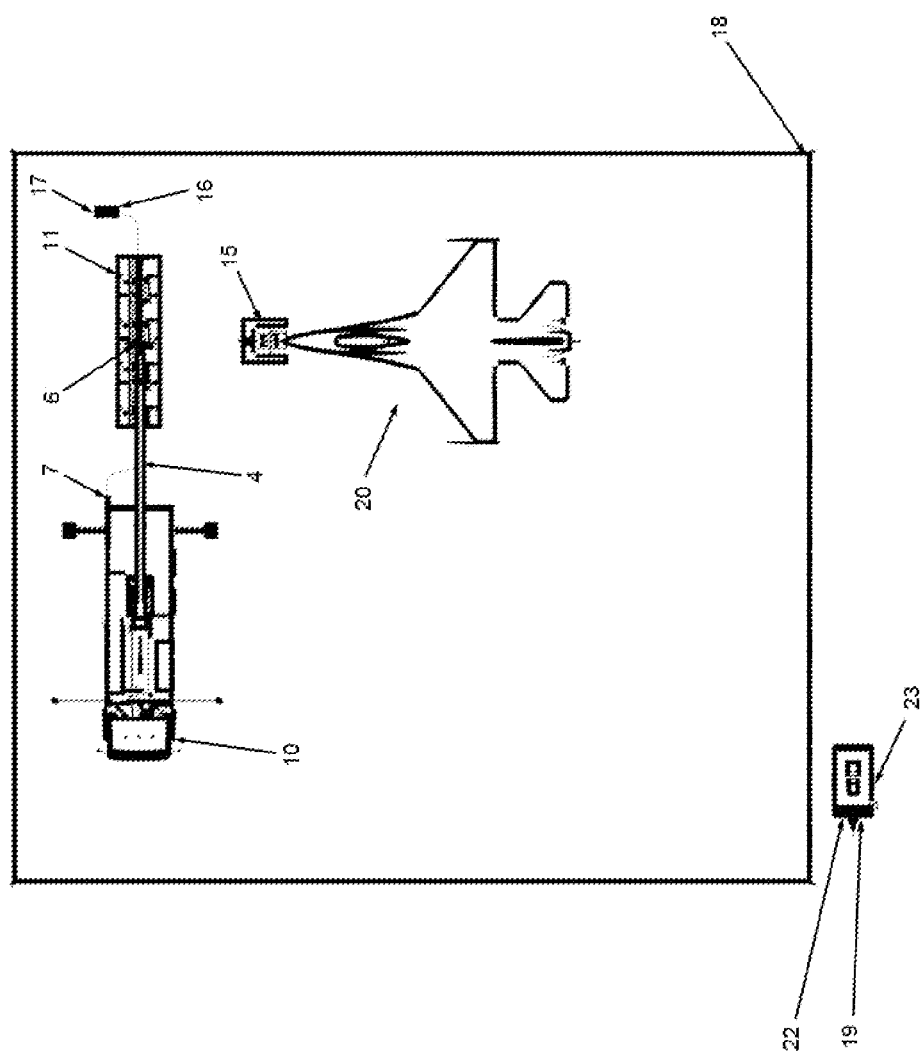
Figure 3:
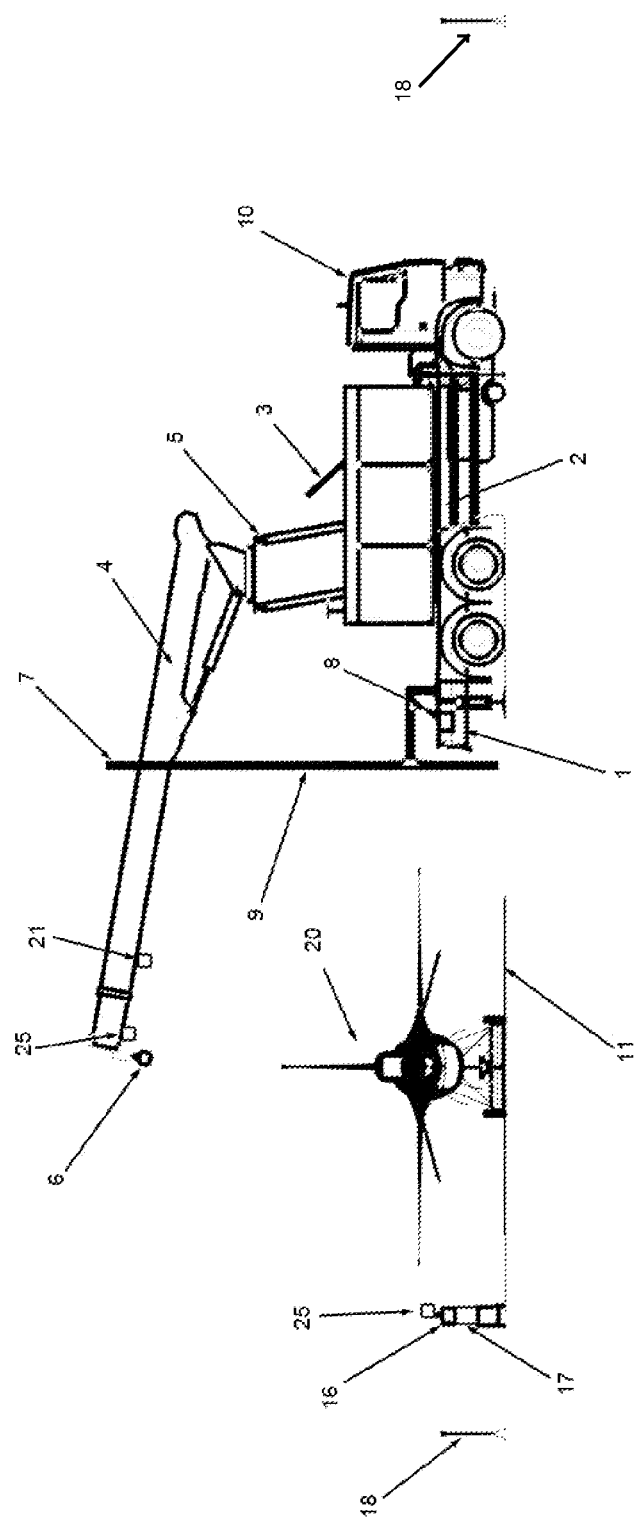
Figure 4:
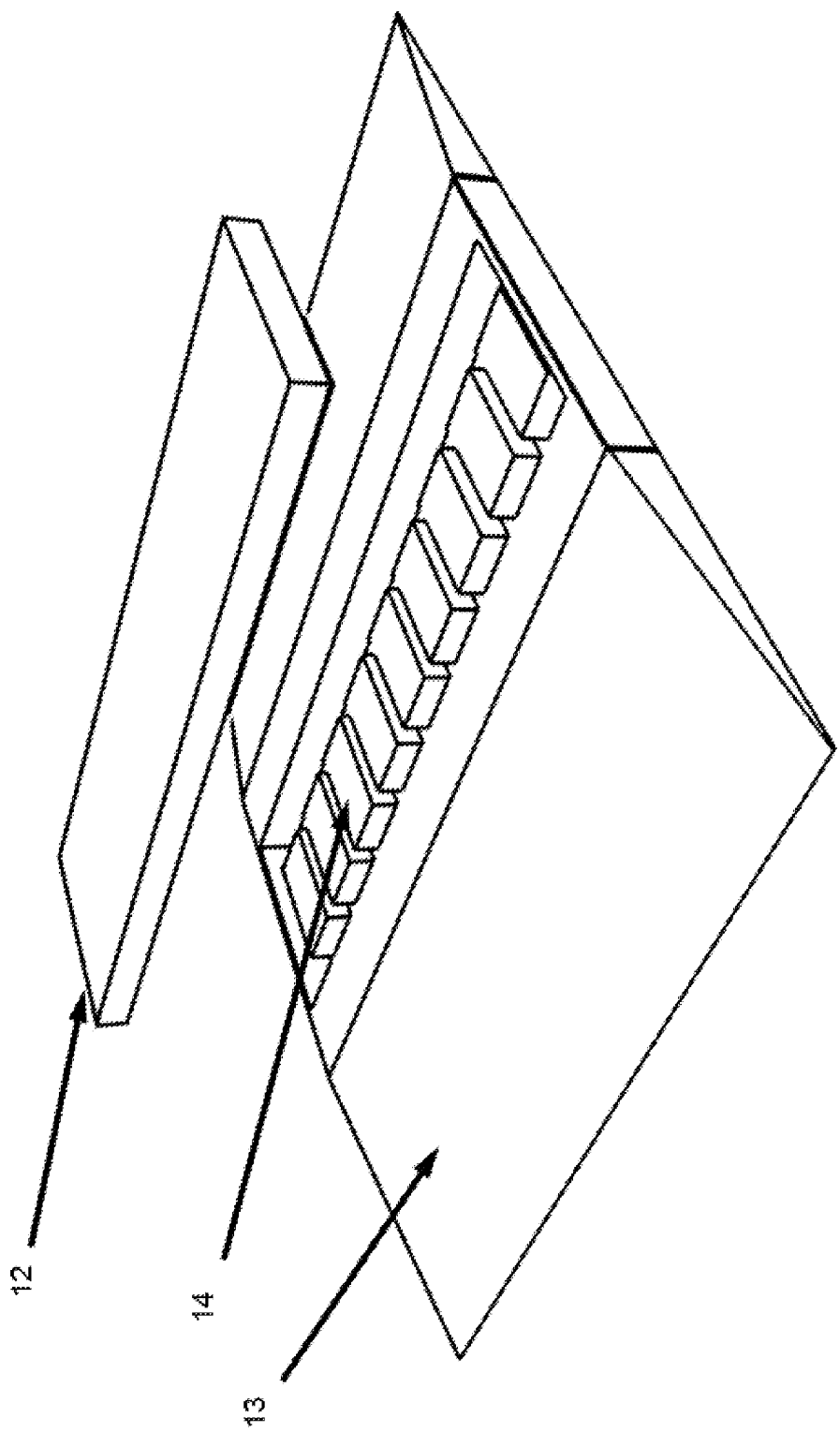

FIG. 2: top view of the nonintrusive inspection system, according to the invention, placed-within the exclusion area;

FIG. 3: Side view (aircraft) of the nonintrusive inspection system in a scanning mode;

FIG. 4: perspective view of detection modules.

In an implementing variant, the complete and nonintrusive inspection system according to the invention is a mobile nonintrusive scanning ensemble, installed on a vehicle chassis 1, with low total weight, onto there is a supplementary chassis, referred to from this point on as superstructure 2, onto which a deformable parallelogram profile 3 is fixed, which has mounted a mechanical boom 4, in a double joint 5, supporting at the end the penetrating radiation source 6. In example embodiments, mechanical boom 4 includes one or more telescopic segments 4', 4", as shown in FIG. 1, with a free end and the penetrating radiation source 6 at the free end, which produces a radiation beam. Along the superstructure 2, a hinged boom 7 is installed, into a joint 8, with one degree of freedom, the hinged boom 7 fitted with an array of detectors 9. In example embodiments, hinged boom 7 includes one or more movable linear sections 7', 7", as shown in FIG. 1. The mechanical boom 4 and the hinged boom 7 are made of steel and lightweight alloys, and both fold from the driver cabin 10 towards the aircraft 20 to be scanned.

The detector line (modular detection assembly) 11, consists of identical modules which are assembled one along of the other, each module is manufactured by machining in solid blocks of metal material, each block consisting of an upper half-housing 12 and a lower half-housing 13 which combine complementary, sealed connection, providing an acclimatized technical cavity, in which an array of detectors 14 is mounted, providing an unshielded passage through the wall of the upper half-housing 12 towards the array of detectors 14, while supporting the weight of an aircraft 20, towed over the detector line 11. The half-housings combine complementary, so that the network of support points ensure the mechanical strength required for discharging the forces applied by the aircraft wheels to the upper half-housing 12, through the support points, to the lower half-housing 13 and then to the ground, at the passing of an aircraft 20 over the detector line (modular detection assembly) 11 through modular ascending and descending ramps, which are designed to generate inclined planes between the track surface and upper surface of the detector line 11.

The detector line (assembly) 11, will be unloaded from the vehicle chassis 1 by modules, and assembled onto the running track inside the exclusion area a, the tugging device 15 is also unloaded from the chassis 1 and ready to be attached to the drivetrain of the aircraft 20, in order to tow the aircraft 20 through the scanning frames. The relocatable penetrating radiation source 16 is unloaded from the chassis and placed following the detector line (modular detection assembly) 11. In a variant of implementation, the relocatable penetrating radiation source 16 is fitted on an adjustable support 17 that allows adjusting the height of the relocatable penetrating radiation source 16 from the ground, to obtain a convenient geometric projection in the scanned image depending on the type and size of the aircraft 20 to be scanned.

Because in the scanning area of aircrafts must be provided active radiological protection against accidental irradiation of possible intruders, a perimeter protection subsystem 18 was provided, which result in a rectangular exclusion area a.

A computerized management subsystem 19, remotely commands and controls the whole subsystem: the direction and speed of the tugging device 15, the position in the exclusion area, and the other peripherals connected to the system according to the invention, including extension and folding controls of the two booms and the four points stalling subsystem of the chassis, and communicating with all the components by a local computer network cabled or wireless.

All physical components of the computerized management subsystem 19, and the operator's workstation are installed in mobile control center 22 which, during transport, is towed by the vehicle chassis 1, and during scanning is placed outside the exclusion zone a. In another implementation variant, the mobile control center 22 can be achieved in a compact version, where all the hardware components are installed in a suitcase type box.

The mobile scanning unit, according to the invention, has two modes of presentation, such as: "scanning mode" and "transport mode". Conversion from one mode to another is done through the operation of hydraulic cylinders, actuators, electromechanical actuators which makes a reconfiguration of the position of the mechanical boom 4 by deformation of the parallelogram profile 3 and/or changing the angle of the mechanical boom 4 to the horizontal and the hinged boom 7, by rotating the mechanical boom 4 compared to the axis of rotation where is mounted.

In transport mode, the mechanical boom 4 and hinged boom 7 are folded along the vehicle chassis 1 to ensure enrollment of the overall dimensions of the assembly in legal limits for driving on public roads, and to ensure proper distribution of loads on wheels. Scanning system components: the detector line (modular detection assembly) 11, mobile tugging device 15, and relocatable penetrating radiation source 16 are loaded on the platform of the vehicle chassis 1 and secured by fixing them on the transport positions.

In scanning mode, the detector line (modular detection assembly) 11 is placed on the runway, the relocatable penetrating radiation source 16 is placed in continuation of the detector line (modular detection assembly) 11 and the tugging device 15 is attached to the aircraft 20 to be scanned. Mechanical boom 4 performs an ascending movement of the deformable parallelogram profile 3, and a tilt angle from driver's cabin 10 in height, forming a variable angle from horizontal, depending on the size of the aircraft 20 to be scanned, then can execute a movement of extension, by telescoping, up to a predefined length; the hinged boom 7 equipped with the second array of detectors 9, executes a folding motion, a rotation of at least 90 degrees from the driver's cabin 10 to the back end of the vehicle chassis 1, in scanning mode.

After the system components are installed, it can proceed to the scanning procedure by initiating a command through the interface command on the mobile command center, at which moment the mobile tugging device 15, that is attached to the powertrain of the aircraft 20 starts to move through the scanning frames, first frame being defined by the detector line (modular detection assembly) 11 placed on runway and the penetrating radiation source 6, carried by the mechanical boom 4, on the mobile scanning unit and the second scanning frame defined by detectors array 9, mounted on hinged boom 7 and the penetrating radiation source 16, placed in continuation of the detector line 11. Mobile scanning unit is equipped with a position monitoring subsystem of the scanned aircraft 20, comprising of at least one proximity sensor 21 that detects the presence of the aircraft 20 in the proximity of the scanning frame and is used to automatically start-the emission of radiation at the beginning of the scanning process and to stop the emission of radiation at the end of the scan of the aircraft 20.

The scanning can be stopped automatically when the scanned aircraft 20 entirely passed through the two scanning frames, when comes dangerously close to any of the scanning system components, if intruders enter the exclusion area a, when triggering the sensor that sends a signal when the mobile tugging device 15 is not following the preset trajectory when passing over the detector line (modular detection assembly) 11, when detecting a dangerous speed variation, during this phase the scanned images of the aircraft 20 are being displayed on the operator's monitor, at the same time being created and archived an unique file containing the scanned image of the aircraft 20 and the live recording of the whole scanning process, and at the end of the scanning phase, the radiation sources 6 and 16 automatically stops, perimeter protection of the exclusion area a is automatically deactivated, the mobile tugging device 15 detaches from the aircraft drivetrain, and after that the aircraft 20 may leave the exclusion area and the scanning cycle may restart.

The mobile tugging device 15 can be done in various embodiments in the present invention, either by a tractor unit driven by a human operator sitting in a cabin protected from radiation by lead or other shielding materials walls, or remotely by radio frequencies or wired. The mobile control center 22 is placed outside the exclusion area a, area delimited by the perimeter protection subsystem 18.

The vehicle chassis 1 has an additional steel chassis referred to as superstructure 2, onto which are assembled all the components of the mobile scanning unit such as: the hydraulic system's related parts: oil tank, distributors, control and safety circuits, the cabinets with the electric and electronic circuits. Some of these latter subassemblies are not figured, considering that they are components by itself, known and unclaimed.

The penetrating radiation source 6 is fixed to the upper end of the mechanical boom 4, so the radiation beams to be collimated on the detector line (modular detection assembly) 11 located on the runway with the purpose of converting the received penetrating radiation to electrical signals that are then processed and transformed into a radiography (top view) of the scanned aircraft 20. Similarly, the mobile penetrating radiation source 16 is placed opposite from the hinged boom 7, so that a beam of radiation to be collimated over second array of detectors 9, installed on hinged boom 7, with the role of turning the penetrating radiation received by to electric signals, which are then processed and converted into a radiography (side view) of the scanned aircraft 20.

Arrays of detectors 9 and 14, may contain hybrid detectors for an X-ray source, with scintillation crystals and photodiodes or monolithic detectors with charge coupled devices. For a gamma-ray source hybrid detectors with scintillation crystals coupled to photomultiplier tubes are used. Detector layout can be done, depending on the source-detector combination and the design of the detectors chosen, in one line, two lines or in arrays of different shapes.

The exclusion area perimeter protection subsystem 18 is an active subsystem of radiological protection, that acts directly on the penetrating radiation sources 6 and 16, so that the sources 6 and 16 are automatically closed or stopped if intruders enter the exclusion area, to protect them against accidental irradiation. The active sensors that are part of perimeter protection subsystem are placed so as to determine a rectangular perimeter, called exclusion area a. These sensors are permanently connected through wireless or wired connection to the mobile control center 22, where they send an alarm signal if intruders enter the area, which automatically turns off the sources 6 and 16 and activates a text, vocal, and graphic message on the software graphic interface for the operator, indicating the penetrated side. The subsystem has been designed to operate in harsh weather conditions respectively, rain, snow, wind, extreme temperatures, etc.

Perimeter protection is disabled to allow entry/exit to/from the exclusion area for scanned aircraft 20.

The mobile control center 22 manages all components and peripherals that are part of the mobile scanning system providing process automation, including a subsystem 26 for acquisition, processing, storage and display of the radiographed image 23, through wireless or wired connection.

In an alternative embodiment of the present invention, the detector line (modular detection assembly) 11 is positioned on the ground and connected with modular access platforms 14 placed on both sides of the detection modules and mechanically connected to these. The incline of these platforms allow the tugging device and the aircraft to run over the detectors.

In an alternative embodiment of the present invention, the detector line (modular detector assembly) 11 is seated in a trench in the runway, with its top at the ground level, eliminating the need for platforms.

For optimal use of the non-intrusive inspection mobile system of aircrafts, at least one alignment system 24 is required, placed on the penetrating radiation sources and oriented towards the radiation detectors arrays in order to facilitate the alignment of the radiation beam with the detector lines of detector arrays.

In an alternative implementation, at least one alignment system 24 may be a laser transmitter 25 whose laser beam is parallel to the radiation beam or superimposed on it allowing an operator to adjust the relative position of the radiation source to the corresponding detector array.

What is claimed:

1. A modular detector line for use with an aircraft to be inspected and a tugging device (15), each having wheels, the modular detector line comprising at least one module, the at least one module comprising:
   a. an upper half-housing made from solid blocks (12);
   b. a lower half-housing made from solid blocks (13);
   c. an array of detectors (14); and
   d. a network of support points between the lower half-housing (13) and the upper half-housing (12), wherein the upper half-housing and the lower-half housing are combined and sealed such that the network of support points discharge loads generated by the wheels of the tugging device (15) and the aircraft to the upper half-housing, through the lower half-housing and onto the ground, and providing a mechanical resistance required to withstand high forces and allowing unhindered passage of penetrating radiation through a wall of the upper half-housing (12) towards the array of detectors (14), while supporting a weight of the tugging device (15) with the aircraft as the aircraft is towed over the upper half-housing.

2. The modular detector line according to claim 1, wherein the at least one module comprises a plurality of identical modules, which can be transported and placed on an aircraft runway to inspect the inspected aircraft.

3. The modular detector line according to claim 1, wherein the at least one module comprises a plurality of identical modules that are connected electrically and mechanically to each other, each module of the plurality of identical modules comprising an upper half-housing, a lower half-housing, and an array of detectors (14), such that the plurality of identical modules function as a continuous detector line.

4. A method for a nonintrusive inspection of an aircraft, comprising:
   a. carrying components of an inspection system to inspect the aircraft;
   b. obtaining a first radiographic image of the inspected aircraft using a first scanning frame through a substantially vertical projection by moving the inspected aircraft with respect to a mechanical boom (4), the mechanical boom (4) having one or more telescopic segments with a free end, and a penetrating radiation source at the free end which produces a radiation beam;
   c. positioning the mechanical boom over the inspected aircraft so that the radiation beam from the penetrating radiation source (6) is oriented towards the ground, and passes through a fuselage of the inspected aircraft in a substantially vertical plane;
   d. providing a detector line (11) having a first array of detectors (14) and positioning the first array of detectors under the inspected aircraft such that the radiation beam from the penetrating radiation source (6) is aligned with the first array of detectors as the inspected aircraft is moved over the detector line;

e. obtaining a second radiographic image of the inspected aircraft using a second scanning frame through a substantially horizontal projection by moving the inspected aircraft with respect to a hinged boom (7) having segments of linear sections, the hinged boom (7) including a second array of detectors (9) installed in a substantially vertical position and at a variable angle with respect to the inspected aircraft, the hinged boom (7) being foldable with respect to a superstructure (2);

f. positioning a relocatable radiation source (16) with respect to the inspected aircraft on an opposite side from the hinged boom (7), a radiation beam is directed towards the hinged boom (7), passing through the fuselage of the inspected aircraft, and incident on the second array of detectors aligned with the radiation beam; and g. acquiring, processing, and displaying data provided by the first array of detectors and the second array of detectors to control scanning through a use of a subsystem for acquisition, processing, storage, and display of the first radiographic image and the second radiographic image, as the inspected aircraft is moved through the first scanning frame and the second scanning frame, a movement of the inspected aircraft being synchronized with an activation of the penetrating radiation source (6) and the relocatable radiation source (16), and data acquisition from the first array of detectors (14) and the second array of detectors (9) to obtain at least two radiographic images of the inspected aircraft from different angles.

5. The method according to claim 4, further comprising performing all the steps in an automated and controlled manner through an IT system (19) interconnected with a computer system.

\* \* \* \* \*